United States Patent [19]

Munz et al.

[11] Patent Number: 4,723,061

[45] Date of Patent: Feb. 2, 1988

[54] GAS SHIELDED, FLUX CORED, WELDING ELECTRODE

[75] Inventors: Robert P. Munz, Jefferson; John R. Gonzalez, Willoughby; Ronald J. Gordish, Kirtland, all of Ohio

[73] Assignee: The Lincoln Electric Company, Cleveland, Ohio

[21] Appl. No.: 891,147

[22] Filed: Jul. 31, 1986

[51] Int. Cl.$^4$ .............................................. B23K 35/22
[52] U.S. Cl. .............................. 219/146.24; 219/146.1
[58] Field of Search ........... 219/146.1, 146.24, 146.32, 219/146.52

[56] References Cited

U.S. PATENT DOCUMENTS

| | | | |
|---|---|---|---|
| 3,818,178 | 6/1974 | Nakabayashi et al. | 219/146.31 |
| 4,343,984 | 8/1982 | Smith et al. | 219/146.3 |
| 4,366,364 | 12/1982 | Arai et al. | 219/146.24 |
| 4,430,122 | 2/1984 | Pauga | 219/146.1 X |
| 4,465,921 | 8/1984 | Sakai et al. | 219/146.24 |

FOREIGN PATENT DOCUMENTS

| | | | |
|---|---|---|---|
| 0821107 | 4/1981 | U.S.S.R. | 219/146.1 |
| 0859088 | 8/1981 | U.S.S.R. | 219/146.1 |
| 1058750 | 12/1983 | U.S.S.R. | 219/146.1 |

*Primary Examiner*—E. A. Goldberg
*Assistant Examiner*—Catherine Sigda
*Attorney, Agent, or Firm*—Body, Vickers & Daniels

[57] ABSTRACT

A flux cored welding electrode for use in electric arc welding with a shielded gas, which electrode includes a tube of low carbon steel having on the inside thereof a titanium dioxide based flux with fluxing ingredients including aluminum oxide in the amount of 0.1 to 0.5% of the total weight of the electrode. The improvement of the invention wherein the titanium dioxide based flux with aluminum oxide free of magnesium or compounds of magnesium.

8 Claims, No Drawings

GAS SHIELDED, FLUX CORED, WELDING ELECTRODE

This invention pertains to the art of electric arc welding and, more particularly, to an improved flux formulation for a flux cored electrode to be used with gas shielding.

BACKGROUND

In the field of electric arc welding, there are a number of criteria upon which an electrode is judged and used by the welding industry.

The first is that the electrode must produce a solid, non-porous weld bead which has the tensile strengths and Charpy Impact values required of the end use to which the weld will be put. Porosity is usually caused by the nitrogen of the air combining, in the heat of the arc, with the metals of the electrode as they transfer from the electrode to the weld pool, and then being released as the deposited weld metal cools. Nitrogen is normally prevented from coming in contact with the arc by including appropriate fluxing materials, such as the metal fluorides, in the core of the electrode and/or, and in the case of the present invention, by additionally surrounding the end of the electrode, the arc and the molten weld pool with a flowing stream of nitrogen free gases such as argon, helium, carbon dioxide, or mixtures of the same.

To obtain the required tensile strengths and Charpy Impact Values, the flux in the core of the electrode normally includes various known steel alloying ingredients such as chromium, nickel, manganese, boron, and silicon in appropriate amounts, such metals being added either as elements, ferro alloys, or alloys of themselves, or as oxides in combination with suitable reducing agents.

Another important criterion of welding electrodes is the ability to weld both downhand and out-of-position, e.g., vertical up or overhead. For downhand welding, the flux in the core of the electrode contains various known slag forming ingredients which float on the molten weld beads as it cools protecting it from the atmosphere and then solidify after the weld metal solidifies. These ingredients are so proportioned that the solidifying temperature of the mixture is below the solidifying temperature of the weld bead so as not to adversely affect the shape of the surface thereof. For out-of-position welding, these slag forming materials not only must coat and shape the weld bead as it solidifies, but must have substantially higher viscosity than the fluxing materials used for downhand welding so as to support the molten weld metal in position against the force of gravity.

This latter requirement is somewhat incompatible with another criteria of the acceptability of a welding electrode, namely the physical appearance of the surface of the weld bead after the weld bead has solidified and the slag has been removed. Thus, it is desirable to have a weld bead which has a generally flat surface rather than a humped surface which is wasteful of weld metal and must sometimes be ground off at substantial expense. Also, the bead desirably should have a shiny surface.

A further criteria is easy removal of the hardened slag.

These last two criteria can only be met by proper formulation of the slag forming materials.

In the past, in order to optimize bead appearance for downhand welding, some degradation of bead shape has been accepted for out-of-position welding. The converse compromise is often made in formulation optimized for out-of-position welding in that out-of-position electrode formulations may sacrifice downhand weld bead appearance.

Formulations used by applicants' assignee for flux cored electrodes to be used with external gas shielding have included substantial amounts of the metal oxides, such as titanium dioxide, silicon dioxide and sodium oxide; lesser amounts of a fluoride such as calcium fluoride, and known steel alloying elements such as boron, carbon, silicon, titanium, vanadium, chromium, manganese, nickel, zirconium and the like.

Specifically, one such electrode included the following range of ingredients:

|  | Maximum | | Minimum | |
| --- | --- | --- | --- | --- |
|  | % Fill | % Elec. Total | % Fill | % Elec. Total |
| $Na_2O$ | 3.40 | 0.51 | 3.02 | .45 |
| $Al_2O_3$ | — | — | — | — |
| $SiO_2$ | 5.35 | 0.80 | 3.90 | 0.58 |
| $TiO_2$ | 57.54 | 8.63 | 52.94 | 7.94 |
| $ZrO_2$ | 1.03 | 0.15 | — | — |
| $CaF_2$ | 1.09 | 0.16 | 0.87 | 0.13 |
| B | 0.026 | 0.004 | 0.021 | 0.0032 |
| Si | 5.89 | 0.884 | 5.32 | 0.798 |
| Mn | 17.79 | 2.67 | 16.93 | 2.54 |
| Fe | 12.0 | 1.80 |  |  |

Iron in powder form is a filler which melts and forms part of the deposited weld metal.

It may be noted that this formulation includes no metallic magnesium.

Such electrode while producing excellent out-of-position welds tended to produce a humped bead in the downhand position which had a dull surface.

THE INVENTION

The present invention contemplates new and improved formulations for the ingredients in flux cored electrodes, which enable high quality weld beads in out-of-position welding while maintaining quality downhand weld beads and which improves weld bead shape and appearance in electrodes designed for downhand welding. In addition to the improvement in weld bead appearance, the formulation produces improved slag removal.

In accordance with the invention, a formulation for a flux cored electrode to be used only in gas shielded arc welding is provided which includes in addition to the above named ingredients, an appreciable amount of aluminum, either in the form of metallic aluminum or various forms of aluminum oxide. However, in the event the aluminum is introduced in metallic form, then normally the welding must be carried out while using a shielding gas containing substantial amounts of carbon dioxide which, as is known, exhibits a very oxidizing atmosphere in the vicinity of the arc. The aluminum forms an oxide and becomes a slag forming ingredient.

When metallic aluminum is employed, there is always some which is not oxidized by the oxygen in the carbon dioxide and transfers over to the weld pool as a residual. Inasmuch as aluminum may deteriorate the notch toughness of the weld bead, the invention prefers to use aluminum oxide in the flux formulation.

The aluminum oxide in combination with the other slag forming ingredients floats on the surface of the molten weld pool and solidifies after the molten weld metal solidifies. Unexpectedly, the presence of this aluminum oxide provided a slag which had the viscosity to support the molten weld metal in out-of-position welding, provided a flat shiny bead on both positions of welding, and was easily removed from the surface of the weld bead, for example, simply with a blast of air from an air hose.

It is particularly important that the flux formulation not contain any metallic magnesium, either in elemental or alloy form. Magnesium, being highly reactive, would reduce the aluminum oxide to aluminum which would transfer to the weld bead adversely affecting its notch toughness. In addition, an electrode which does not contain any magnesium or magnesium oxide is much more tolerant to the presence of organic materials on the surfaces of the workpieces being welded. Inasmuch as the surface of steels being welded often has a thin layer of oil, it will be appreciated that this decreased sensitivity to contaminants is very desirable.

The preferred flux formulation, which in accordance with the invention includes the presence of aluminum oxide and excludes magnesium, also contains other known steel alloying ingredients usually present in flux formulations which will transfer to the molten weld pool and affect an alloying action thereon to provide the desired yield strengths or Charpy Impact Values. In addition, the formulation includes known slag forming ingredients such as sodium oxide, silicon dioxide, titanium dioxide, and the fluorides. Such ingredients are normally present in proportions to provide a eutectic solidifying temperature for the slag less than the solidifying temperature of the molten weld metal.

To our knowledge, aluminum oxide has been employed in the flux formulation of flux cored electrodes for use in gas shielded arc welding as is exemplified in U.S. Pat. Nos. 4,343,984; 3,818,178; and 4,465,921, but all of these patents employ magnesium whenever aluminum oxide is present.

In accordance with the preferred embodiment of the invention, aluminum oxide is present in amounts of from 0.54 to 27.0 percent of the total weight of fluxing ingredients on the inside of the electrode which, considering a percentage of fill of 18.5%, provides aluminum oxide of from 0.1 to 5 percent of the total electrode weight.

Preferred formulations for use with a low carbon steel tube are as follows:

EXAMPLES

| Ingredient | A Fill | A Electrode Total | B Fill | B Electrode Total |
|---|---|---|---|---|
| Na$_2$O | 2.48 | 0.50 | 1.8 | 0.27 |
| K$_2$O | — | — | 0.72 | 0.11 |
| Al$_2$O$_3$ | 6.50 | 1.20 | 16.5 | 2.47 |
| SiO$_2$ | 8.50 | 1.57 | 7.0 | 1.05 |
| TiO$_2$ | 24.05 | 4.44 | 38.7 | 5.80 |
| ZrO$_2$ | — | — | 0.7 | 0.11 |
| CaF$_2$ | 1.05 | 0.19 | 0.98 | 0.15 |
| B | 0.003 | 0.0006 | .017 | .002 |
| Si | 5.3 | .98 | 5.61 | 0.84 |
| Mn | 14.50 | 2.69 | 17.30 | 2.59 |
| Fe | 35.40 | 6.56 | 7.80 | 1.17 |
| Electrode | — | Balance | — | Balance |

The fluxing ingredients comprise about 10 to 20 weight percent of the total electrode and preferably 15 to 18.5%.

The preferred shielding gas is, with Example A, 100% CO$_2$ and, with Example B, either 100% CO$_2$ or 75% argon and 25% CO$_2$. Obviously, other shielding gases may be employed.

Using the present invention, substantially flat weld beads have been obtained in both downhand and out-of-position welding with minimal double beading and a slag which is easily removed with an air hose. In addition, sensitivity to organic contaminants on the surface of the steel being welded is decreased.

In accordance with an aspect of the invention the flux cored electrode for electric arc welding using a shielded gas comprises a low carbon steel tube having a flux on the inside thereof consisting of titanium, silicon, potassium and sodium oxides in an approximate total amount of 25% to 60%, steel alloying ingredients selected from the class consisting of silicon, manganese, nickel, chromium and boron in approximate total amounts of 13% to 30%, and calcium fluoride in approximate amounts of up to 10%. The improvement in accordance with the invention comprises inclusion in the flux of aluminum oxide from 0.1 to 5.0% of the total electrode weight with the flux including no magnesium, in other words, being magnesium free.

The invention has been described with reference to preferred embodiment. Obviously, modifications and alterations will occur to others upon a reading and understanding of this specification. It is my intention to include all such modifications and alterations insofar as they come within the scope of the appended claims.

Having described our invention, we claim:

1. A flux cored welding electrode for use in electric arc welding with a shielding gas, comprised of a tube of low carbon steel, having on the inside thereof titanium dioxide based flux with fluxing ingredients including aluminum oxide in amounts of from 0.1 to 5.0 percent of the total weight of the electrode, the titanium dioxide based flux with aluminum oxide being free of magnesium or compounds of magnesium.

2. A flux cored electrode for gas shielded electric arc welding comprising in combination: a tube of low carbon steel, having on the inside thereof, a titanium dixode based flux fill of from 10 to 20% of the total weight of the electrode, said flux fill containing aluminum oxide in amounts of from 0.54% to 27.0% and no magnesium.

3. A flux cored tubular electrode for electric arc welding using a shielding gas, comprised of a low carbon steel tube containing on the inside a flux formulation comprising titanium dioxide, other metallic oxides selected from the class consisting of silicon potassium and sodium, steel alloying ingredients selected from the class consisting of silicon, manganese, nickel, chromium, vanadium and boron, fluoride compounds selected from the class consisting of the fluorides of calcium, potassium, sodium, barium; the improvement which comprises aluminum oxide of from 0.1 to 5.0 percent of the total electrode weight, there being no magnesium in said flux formulation.

4. A flux cored electrode for electric arc welding, using a shielding gas, comprised of a low carbon steel tube having a flux on the inside thereof, said flux comprising titanium dioxide and silicon, potassium and sodium oxides in approximate total amounts of such metal oxides being from 25% to 60% of said flux, steel alloying ingredients in said flux selected from the class consisting of silicon, manganese, nickel, chromium and boron in approximate total amounts of from 13% to 30% of said flux, calcium fluoride in approximate amounts of 0.0% to 10% of said flux, the improvement which comprises aluminum oxide of from 0.1 to 5.0 percent of the total electrode weight, said flux being magnesium free.

5. The electrode of claim 1 wherein said fluxing ingredients additionally include metallic oxides other than titanium dioxide and aluminum oxide, and also fluorides and steel alloying ingredients.

6. The electrode of claim 2 wherein said fluxing ingredients additionally include metallic oxides other than titanium dioxide and aluminum oxide, and also fluorides and steel alloying ingredients.

7. A flux cored welding electrode for gas shielded electric arc welding comprising in combination a tube of low carbon steel having on the inside thereof the following flux ingredients in the approximate amounts stated:

Sodium Oxide: 0.50
Aluminum Oxide: 1.20
Silicon Dioxide: 1.57
Titanium Dioxide: 4.44
Calcium Fluoride: 0.19
Silicon: 0.98
Manganese: 2.69
Iron: 6.56 all stated as a percent of the total electrode weight.

8. A flux cored welding electrode for gas shielded electric arc welding comprising in combination a tube of low carbon steel having on the inside thereof the following flux ingredients in the approximate amounts stated:

Sodium Oxide: 0.27
Potassium Oxide: 0.11
Aluminum Oxide: 2.47
Silicon Dioxide: 1.05
Titanium Dioxide: 5.8
Zirconium Dioxide: 0.11
Calcium Fluoride: 0.15
Boron: 0.002
Silicon: 0.84
Manganese: 2.59
Iron: 1.17 all stated as a percent of the total electrode weight.

* * * * *